W. D. EDWARDS.
APPARATUS FOR DEHYDRATING OR DRYING FOOD PRODUCTS AND OTHER MATERIALS.
APPLICATION FILED FEB. 26, 1919.
1,369,411.
Patented Feb. 22, 1921.
3 SHEETS—SHEET 1
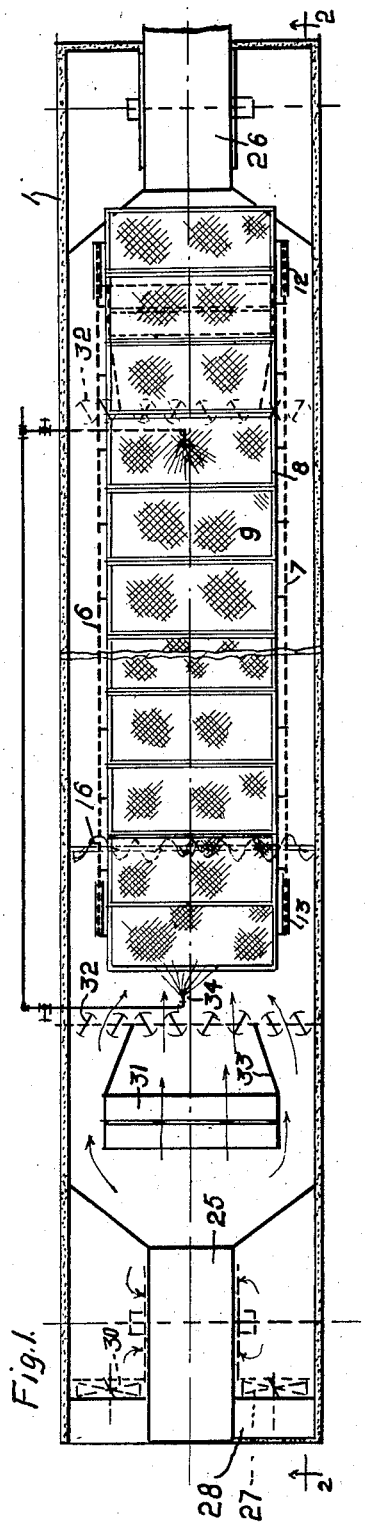
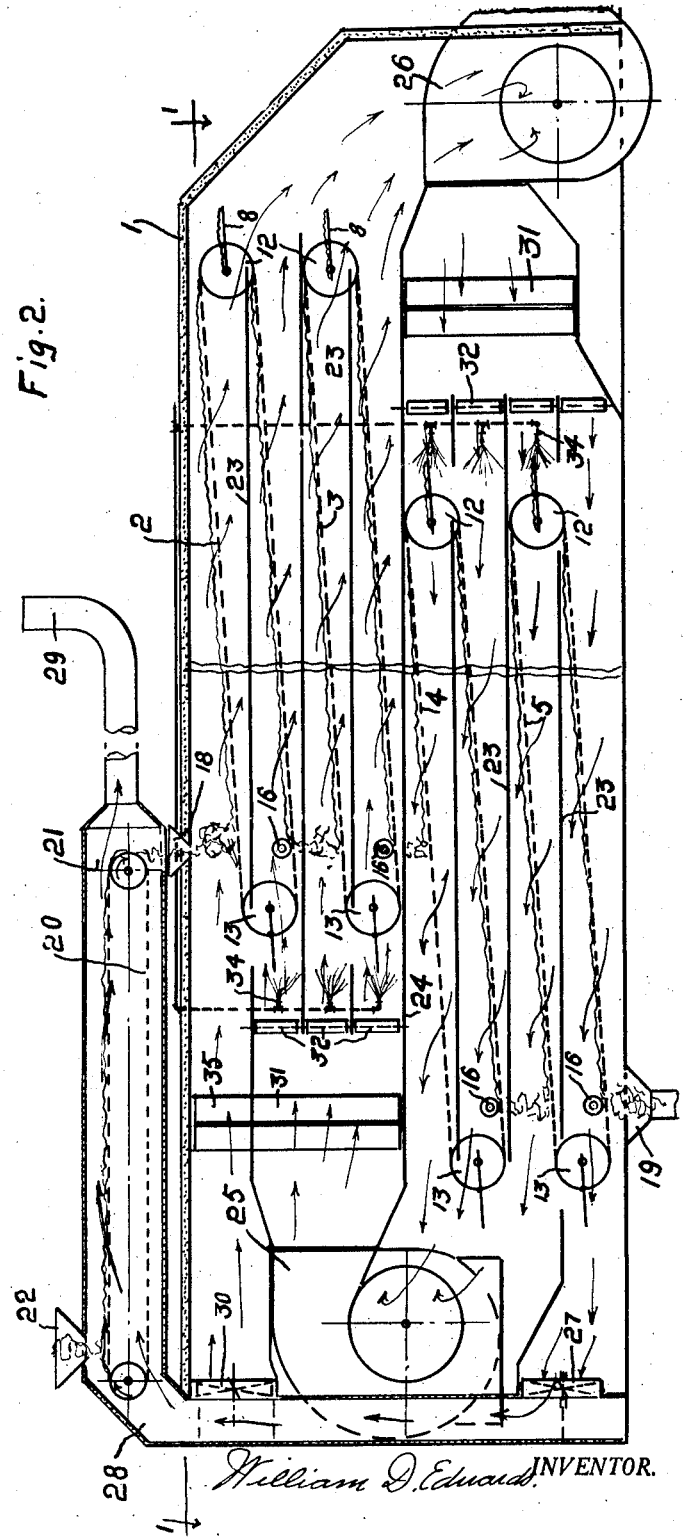
William D. Edwards INVENTOR.

W. D. EDWARDS.
APPARATUS FOR DEHYDRATING OR DRYING FOOD PRODUCTS AND OTHER MATERIALS.
APPLICATION FILED FEB. 26, 1919.
1,369,411.
Patented Feb. 22, 1921.
3 SHEETS—SHEET 2.
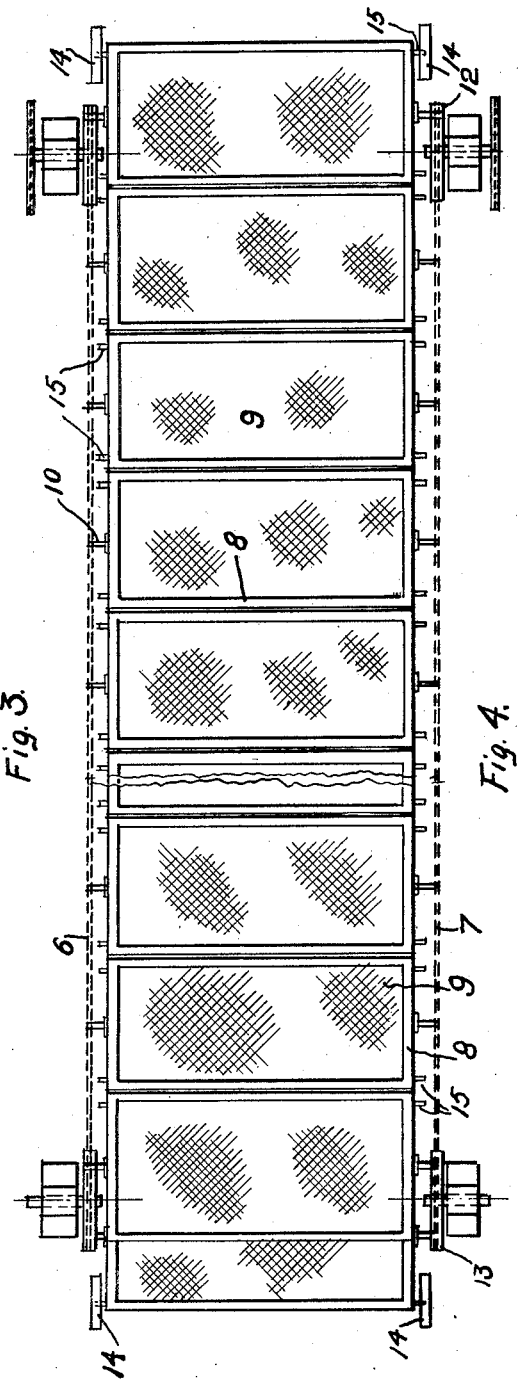
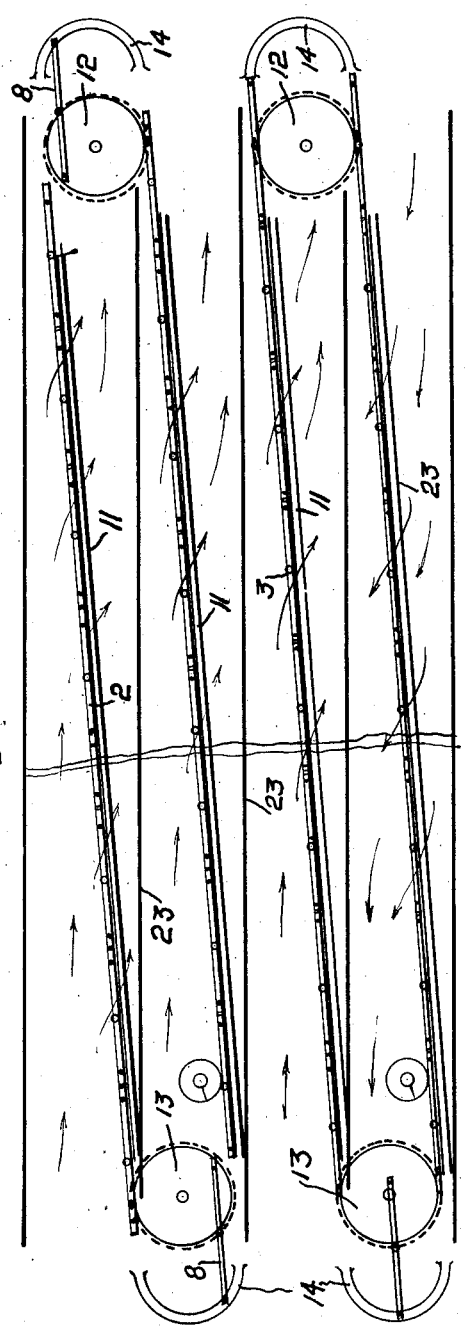
William D. Edwards, INVENTOR.

W. D. EDWARDS.
APPARATUS FOR DEHYDRATING OR DRYING FOOD PRODUCTS AND OTHER MATERIALS.
APPLICATION FILED FEB. 26, 1919.

1,369,411.

Patented Feb. 22, 1921.

William D. Edwards INVENTOR.

UNITED STATES PATENT OFFICE.

WILLIAM D. EDWARDS, OF MONTE VISTA, COLORADO.

APPARATUS FOR DEHYDRATING OR DRYING FOOD PRODUCTS AND OTHER MATERIALS.

1,369,411.     Specification of Letters Patent.     Patented Feb. 22, 1921.

Application filed February 26, 1919. Serial No. 279,243.

*To all whom it may concern:*

Be it known that I, WILLIAM D. EDWARDS, a citizen of the United States, residing at Monte Vista, county of Rio Grande, State of Colorado, have invented a certain new and useful Improvement in Apparatus for Dehydrating or Drying Food Products or other Materials, and declare the following to be a full, clear, and exact description of the same, such as will enable other skilled in the art to which it pertains to make and use the same, reference being had to the accompanying drawings, which form a part of this specification.

My invention has for its object to produce a simple and efficient apparatus for dehydrating or drying various materials.

A further object of the present invention is to produce a simple and efficient dehydrating or drying apparatus so constructed and arranged that the conditions to which the material which is being dried is subjected may be varied quickly and conveniently within a comparatively wide range of limits, so as to permit the conditions to be adjusted to suit the end which is being sought.

A further object of the present invention is to produce a simple compact and efficient dehydrating or drying unit.

A further object of the present invention is to produce a simple and novel method of drying materials which may be adapted easily and conveniently to produce the best results for any given material which is being treated.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a horizontal section through a drying apparatus arranged in accordance with a preferred form of my invention taken approximately on line 1—1 of Fig. 2;

Fig. 2 is a vertical section through the apparatus shown in Fig. 1 taken approximately on line 2—2 of Fig. 1;

Fig. 3 is a top plan view on a somewhat larger scale than Fig. 1, of the conveyers for the commodity to be dried;

Fig. 4 is a side elevation of some of the conveyers, including the horizontal partitions which separate the drying chamber into individual compartments;

Figure 6:
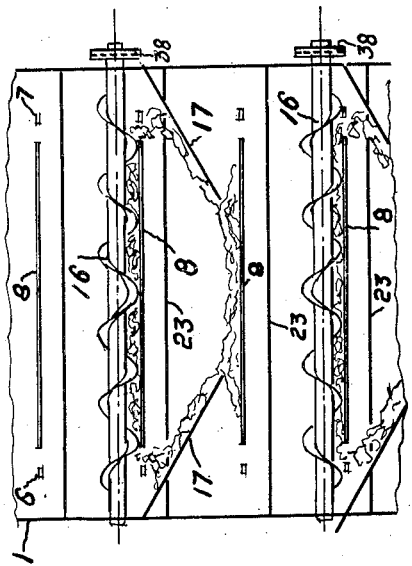
Fig. 6 is a transverse section on an enlarged scale, taken approximately on line 6—6 of Fig. 5.

While my invention may be carried out in a variety of ways and take various different forms, I shall, for the sake of brevity, confine the detailed descripion to the single apparatus illustrated in the drawings.

Referring to the drawings, 1 represents an elongated shell or casing of any desired height and width. Within the member 1 are arranged, one above the other, a series of endless conveyers, 2, 3, 4 and 5, all running in the same direction. Each conveyer is conveniently made of two separated sprocket chains, 6 and 7, connected together by a series of trays, 8, lying close enough together to form a continuous belt or apron except at the turns. Each tray is preferably made of a frame across which is stretched an open work material, 9, such as wire mesh or other suitable material. Each tray is connected at its ends to the chains by means of trunnions, 10, located at the longitudinal axis of the tray. In order to prevent the trays from rotating, suitable guides or supports, 11, are arranged in proximity to the upper and lower run of each conveyer. These guides or supports terminate a short distance from each of the sprocket wheels, 12 and 13, around which the conveyers pass. Beyond each sprocket wheel are curved guides, 14, the members of which are spaced apart a distance slightly greater than the length of the trays so as to be capable of engaging with pins, 15, projecting from the ends of the trays near the front and rear edges thereof. The parts are so proportioned, as will best be seen from Figs. 3 and 4, that when a tray forming part of the upper run of a conveyer reaches the corresponding sprocket wheel 12, the pins, 15, in the vicinity of the advance edge of that tray engage the corresponding guides, 14, so that the overhanging or projecting end of the tray is guided and supported while the tray is being carried by its trunnions around the sprocket wheel. In this way each tray remains in a horizontal position as it passes around the turn from the upper run to the lower run; there being no overturning of the trays, but the load which any tray may be carrying when it reaches a turn remaining on the tray while the turn is being made, and thereafter. This arrangement permits both runs of each endless conveyer to be used as a load-carrying member, so that for the same capacity, a much more compact apparatus is obtained than is possible in other types of driers where simply the upper run of each conveyer is utilized.

Because there is no dumping of the material from a conveyer at the point where the conveyer makes a turn, some means must be provided for positively removing the material. This may conveniently be accomplished by placing above the lower run of each conveyer, at the point where the discharge is to take place, a right and left hand screw, 16, as best shown in Fig. 6, each of these screws lying close enough to the passing trays to scrape them clean, the material being fed in opposite directions and falling over the ends of the trays. The several conveyers are intended, of course, to deliver material from one to the other and, in order that the material which is being discharged over the sides of one conveyer may be deposited upon the upper run of the next underlying conveyer, deflecting plates, 17, may extend inwardly and downwardly from the sides of the inclosing housing or casing at the discharge points; the deflecting plates extending far enough over the top of the conveyer adapted to receive the material, to insure that the material discharged from one conveyer will be satisfactorily deposited upon the receiving conveyer.

The material to be dried is fed into the top of the housing or casing through a hopper or opening, 18, located above the left hand end of the uppermost conveyer. It is carried by the several conveyers down through the housing or casing and is finally discharged through the hopper or outlet, 19, at the bottom.

Before entering the main drying chamber the material may receive a preliminary treatment while carried on a conveyer, 20, arranged in a housing or casing, 21, lying above the member 1 and having a discharge outlet just above the hopper or inlet, 18. The material to be treated is delivered into the chamber 21 through a hopper or inlet, 22, lying above one end of the upper run of the conveyer 20. In the chamber 21 are removed the surface moisture and steam, if the material has been subjected to a steam treatment or a partial cooking.

The main drying chamber is preferably provided with transverse partitions, 23, so located that each run of each conveyer lies in an individual compartment, thus making twice as many compartments as there are conveyers. It is further desirable that each conveyer forms a more or less complete partition between the ends of its individual compartment so that air in traveling from one end of the compartment to the other must pass through the conveyer and thus come into intimate contact with the material carried by the latter. This may conveniently be accomplished by placing the conveyers diagonally, each conveyer entering its individual compartment near the bottom and leaving it at the top.

The partition, 24, which is that one of the horizontal partitions which lies between the second and third conveyers separates the main heating chamber into two halves isolated from each other except at the point where the material must pass through when it is discharged from the second conveyer to the third conveyer. In this way the main heating chamber is divided into two separated chambers each of which in turn is divided into a series of compartments. This construction makes it a simple matter to secure a circulation of air flowing in the same direction through all of the compartments of the upper chamber and in the opposite direction through all of the compartments in the lower chamber; so that where a circulation is produced by fans or blowers, the air is carried through the shortest possible path and consequently with a minimum expenditure of energy.

In the arrangement shown, there is a fan or blower, 25, which takes air from the lower half of the drying chamber and blows it through the compartments of the upper half of the drying chamber. At the opposite end of the drying chamber from that at which the blower 25 is located is another blower, 26, which takes air from the upper half of the drying chamber and forces it into the lower half.

It is not enough simply to maintain a circulation of the same air, because the air would soon become saturated and would take up no more moisture. It is therefore necessary to remove moisture from the air and the simplest way of doing this is to remove some of the moisture-laden air and replace it by fresh air. This may conveniently be accomplished by providing a fan or blower, 27, in position to draw air out of the lower half of the drying chamber and particularly the lowermost compartment in the latter, at the end of the drying chamber opposite that at which the fan or blower 26 is located. Instead of discharging the air directly from the fan or blower 27 to atmosphere it may conveniently be carried through a suitable conduit, 28, into and through the preliminary drying chamber 21 from which it is discharged through a suitable outlet or flue, 29. The amount of fresh air to compensate for the air withdrawn by the fan or blower, 27, is delivered, preferably into the uppermost compartment of the upper half of the heating chamber by means of a fan or blower, 30, which draws air from an outside point. The amount of air passing over the material to be dried is not the only factor that needs to be considered, but other factors are the temperature and the humidity of the air. Again, temperature and humidity are not independent of each other because of the fact that the humidity of the body of air containing a given amount of moisture varies with the temperature so that the same body of air at a low temperature may have a high humidity and at a high temperature have a low humidity. I have also discovered that considerable difference in the character of the product can be made by changing the possible combinations of temperature and humidity. Thus in the case of dried or dehydrated vegetables, for example, it is desirable that when the moisture is returned to them by the consumer, they should be as nearly like fresh vegetables as possible. I have discovered that this capacity for restoration may be given to vegetables by properly controlling the temperature and the humidity of the air, efficiency being obtained by alternating low temperatures and high humidity with high temperatures and low humidity which, if used alone, would not give to the product the desired characteristics.

For the purpose of securing a wide range of control over the temperature and humidity conditions of the air I place between each of the fans or blowers 25 and 26 and the corresponding half of the heating chamber a heater, 31, provision being made so that part of the air discharged from each of the fans or blowers may go through the heater and part go around or past the heater without being affected thereby. Suitable dampers or valves are provided for the purpose of controlling the flow of air through and past the heaters so that any desired portion of the air may be heated while the remainder is left unheated. A further refinement is to provide individual control for each of the small compartments into which the heating chamber is divided, so that the air flowing through one compartment may have a high temperature and low humidity, while in the next compartment into which the material passes it will be subjected to a stream of air having a low temperature and a high humidity; it being understood that these extremes are simply given as examples because any variation from one extreme to the other may be employed.

In the arrangement shown, the control of the air is by means of dampers or valves, 32, a set of these being placed in the inlet end of each compartment and forming, when closed, a barrier across the same. In order to insure that there will be a clear demarcation between the streams of cooler and warmer air at the line of the dampers, each heater may be placed in a sort of tunnel or chute, 33, which terminates at the line of dampers and embraces a certain number of the latter. When the dampers in the outlet end of the tunnel or chute are closed, no heated air will be delivered into the particular compartment to which access is given through these dampers. In the same way, if the dampers at the outlet end of the tunnel be left open and the other dampers are closed, there will be none of the cooler air delivered but all of the air will be air that has been heated.

It is sometimes desirable actually to add moisture to the air from some external source at some point in the travels of the material through the drier. To this end I have placed in the inlet end of each of the compartments except the uppermost compartment and the lowermost compartment, a nozzle, 34, through which steam or a spray of water may be admitted to combine with the air entering the compartment.

Since the fresh air that is delivered into the drier comes in contact with the raw or wet material just entering the drier, it is preferable that means be provided for heating this air so as to give it a high temperature and low humidity and to this end I have placed in the passage between the fan or blower, 30, and the uppermost compartment a heater, 35.

The operation of my improved apparatus has been explained in connection with the description of the construction thereof and the method which is practised and will be further evident from the arrows on the drawings which indicate the direction of travel of the air at various points.

Figure 5:
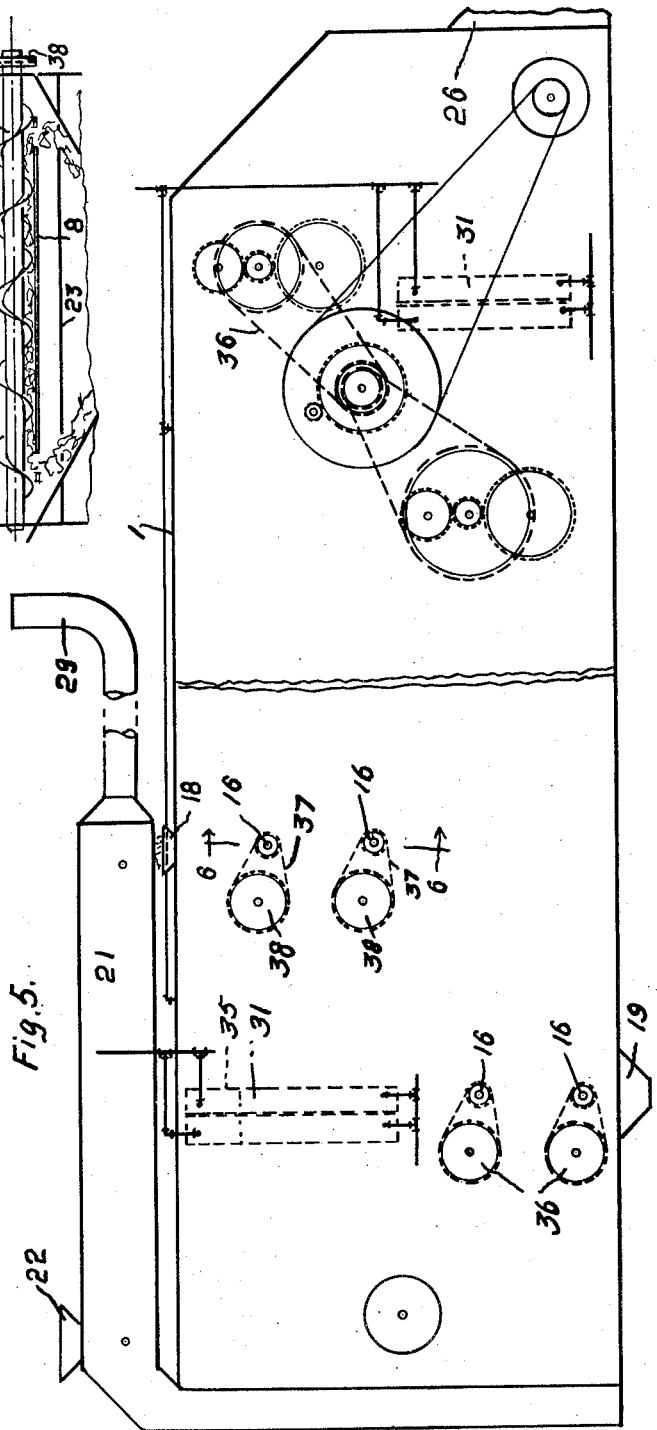
Fig. 5 is a side elevation of the complete apparatus.

The conveyers may of course be driven in any suitable manner and, since most material shrinks rapidly in bulk as it becomes dry and where the material that is being treated is of a kind that shrinks rapidly in bulk when it is dried, the driving mechanism is preferably so arranged that, passing from the top to the bottom of the apparatus, each conveyer travels more slowly than the one above it; suitable driving connections, 36, for this purpose being illustrated in Fig. 5. It will also be understood that the discharge screws may be driven in any suitable way. In the arrangement shown, they are driven by sprocket chains, 37, passing over sprocket wheels, 38, co-axial with and moving in unison with the sprocket wheels, 13, of the conveyers.

While I have illustrated and described with particularity only a single preferred apparatus for carrying out my invention, I do not desire to be limited to the specific details thus illustrated and described; but intend to cover all forms and arrangements which fall within the terms employed in the definitions of my invention constituting the appended claims.

I claim:

1. In combination, a drier divided into an upper and lower chamber, means for gradually conveying material through one chamber and then through the other, means for drawing air from one end of the lower chamber and discharging it into one end of the upper chamber, and means for drawing air from the opposite end of the upper chamber and discharging it into the remaining end of the lower chamber.

2. A drier having two chambers, means for carrying material in succession through said chambers, means connecting corresponding ends of said chambers for forcing air from one to the other, and means connecting the opposite ends of said chambers for forcing air from one to the other.

3. A drier having two chambers, means for passing a material through one chamber and then through the other, and means connecting the corresponding ends of said chambers together and causing the air to flow in an endless path through said chambers.

4. A drier having two chambers, means for passing a material through one chamber and then through the other, means connecting the corresponding ends of said chambers together and causing the air to flow in an endless path through said chambers, means for withdrawing some of the air from one of the chambers, and means for inducing a compensating amount of air into the other chamber.

5. A drier having two chambers, each chamber being divided into a plurality of compartments, means for producing a continuous circulation of air in the same direction through all of the compartments in one chamber and in the opposite direction through all of the compartments in the other chamber, and means for heating a variable amount of the air entering certain of said compartments.

6. A drier having two chambers, each chamber being divided into a plurality of compartments, means for producing a continuous circulation of air in the same direction through all of the compartments in one chamber and in the opposite direction through all of the compartments in the other chamber, means for heating a variable amount of the air entering certain of said compartments, and means for adding moisture to the air entering certain of said compartments.

7. In a drier having a chamber, an endless conveyer extending through said chamber, said conveyer containing perforated trays adapted to contain the material to be conveyed, means for maintaining the trays right side up while traveling along the upper and lower runs and while passing around a turn, a partition extending through the chamber between the upper and lower runs and dividing the chamber into two compartments, the parts being so constructed and arranged that each run enters its compartment near the bottom and leaves it at a point near the top, and means for producing a flow of air through said compartments.

8. A drier having a chamber, a perforated support for material extending across said chamber and forming with the wall of the chamber above the same a compartment decreasing gradually in height from one end toward the other, means for introducing air into the larger end of said compartment, and means for withdrawing air from the chamber at a point below the shallower end of said compartment.

9. In a drier, a plurality of independent chambers arranged side by side, perforated supports for material to be dried extending diagonally across said chambers so as to divide each into two compartments larger at one end than the other, a blower for introducing air into all of said chambers at one end thereof, valve mechanism between each of said chambers and the air supplying means, and means for withdrawing air from the opposite end of all of said chambers.

10. In a drier, a plurality of independent chambers arranged side by side, perforated supports for material to be dried extending diagonally across said chambers so as to divide each into two compartments larger at one end than the other, a blower for introducing air into all of said chambers at one end thereof, valve mechanism between each chamber and the air supplying means, and means at the inlet ends of said chambers for introducing moisture into the air.

In testimony whereof, I sign this specification.

WILLIAM D. EDWARDS.